(12) United States Patent
Gutierrez

(10) Patent No.: US 8,857,377 B2
(45) Date of Patent: Oct. 14, 2014

(54) MULTI-FUNCTION ANIMAL JACKET

(76) Inventor: Margo Gutierrez, Pinckney, MI (US)

(*) Notice: Subject to any disclaimer, the term of this patent is extended or adjusted under 35 U.S.C. 154(b) by 0 days.

(21) Appl. No.: 13/560,264

(22) Filed: Jul. 27, 2012

(65) Prior Publication Data

US 2013/0025542 A1    Jan. 31, 2013

Related U.S. Application Data

(60) Provisional application No. 61/574,078, filed on Jul. 28, 2011.

(51) Int. Cl.
*A01K 13/00* (2006.01)

(52) U.S. Cl.
CPC ............... *A01K 13/00* (2013.01); *A01K 13/006* (2013.01)
USPC .......................................... 119/600; 119/850

(58) Field of Classification Search
USPC ........ 119/850, 600, 650, 654, 671, 678, 677, 119/609, 608; 54/79.1, 79.2, 79.3, 79.4
IPC ..................................... A01K 13/00; B68C 5/00
See application file for complete search history.

(56) References Cited

U.S. PATENT DOCUMENTS

| | | | |
|---|---|---|---|
| 2005/0070405 A1* | 3/2005 | Egger | 482/78 |
| 2009/0312676 A1* | 12/2009 | Rousso et al. | 601/15 |
| 2010/0000547 A1* | 1/2010 | Johnson et al. | 128/845 |

* cited by examiner

*Primary Examiner* — Shadi Baniani
(74) *Attorney, Agent, or Firm* — Thomas Heed

(57) ABSTRACT

A self-contained, multi-function animal jacket, which massages the animal with movable elements and which vacuums up and collects the hair loosened by the massage movable elements.

3 Claims, 5 Drawing Sheets

MULTI-FUNCTION ANIMAL JACKET

FIELD OF INVENTION

This invention relates to domesticated animal care and comfort. Specifically, this invention is a multi-function animal jacket.

BACKGROUND OF INVENTION

This invention is an animal jacket, designed to massage, loosen hair, and vacuum the hair, simultaneously. Many households have one or more domesticated animals, such as a dog or cat. One of the main complaints surrounding domesticated animals is that they shed hair, creating a housekeeping chore and, potentially, an allergen.

There are several tools on the market to deal with the hair shed by domesticated animals, namely grooming brushes, hand-held vacuums, lint-brushes, and the like. All of these tools are designed to pick-up hair that has been introduced into the environment.

There are several examples of animal jackets, groomers and massagers currently on the market, including numerous patents. For example, U.S. Pat. No. 7,444,959, by named inventor Hensley ("Hensley 959") is entitled, "Animal self-grooming system." Hensley 959 discloses a platform containing horizontally and vertically mounted brushes. The platform is placed in a household such that the animal rubs against it. The named inventor claims that this action also massages the animal. Attraction substances, such as catnip, can be used to attract the animal. This is a self-groomer for animals.

U.S. Pat. No. 7,399,286, by named inventor Jackson ("Jackson 286") is entitled, "Massage devices and methods of using same." Jackson 286 discloses a laminated fabric that can be used, in conjunction with a lubricant, to provide an animal massage.

U.S. Pat. No. 6,834,619, by named inventor Rampersad ("Rampersad 619") is entitled, "Pet grooming mitt with continuous reservoir." Rampersad 619 teaches a mitt that can be used to bath and groom a pet. The mitt contains a reservoir and has a multitude of rubber nibs, which will comb the animals fur and massage its skin.

U.S. Pat. No. 6,109,214, by named inventor Rampersad ("Rampersad 214") is entitled, "Pet grooming mitt with reservoir and medial concentric bristle patterns." Rampersad 214 teaches, essentially, the same invention as Rampersad 619, except that it uses a different bristle pattern.

U.S. Pat. No. 6,477,988, by named inventor Burnett ("Burnett 988") is entitled, "Doggy wrap." Burnett 988 discloses a dog jacket, which is easier to put on the dog.

U.S. Pat. No. 5,839,393, by named inventors Rupp, et. al., ("Rupp 393") is entitled, "Animal restraint jacket." Rupp 393 teaches a restraint jacket. The disclosure drawings show the jacket on a mouse. The jacket contains an aperture through which a catheter or other medical device can be inserted. Part of the catheter or medical device, would, of course, be on the animal side of the jacket.

U.S. Pat. No. 5,293,840, by named inventor Wedlick ("Wedlick 840") is entitled, "Laboratory animal restraining jacket with a sealable medical device holding pocket." Wedlick 840 discloses another animal jacket for laboratory animals. The jacket contains a sealable medical device holding pocket.

U.S. Pat. No. 5,211,131, by named inventor Plyler ("Plyler 131") is entitled, "Pet grooming device with detachable head." Plyler 131 teaches a device, which looks similar in shape to a hand-held hot-air blow-dryer. The device has bristles, which loosen hair and massage the skin. The device also contains a vacuum, which vacuums up the hair that is loosened. The vacuum compartment is adjacent to the motor compartment and contains a collection bag.

U.S. Pat. No. 4,489,676, by named inventor Colquist ("Colquist 676") is entitled, "Canine cervical jacket." Colquist 676 teaches an animal jacket which is intended to prevent the animal from biting its hind quarters. The jacket is made of material, with openings for the animal's legs. The jacket contains removable foam plastic body, of sufficient rigidity to inhibit the animal from biting its hind quarters. The jacket contains additional sleeves for accepting additional elongated stiffening elements.

U.S. Pat. No. 4,114,352, by named inventors Horton, et. al. ("Horton 352") is entitled, "Protective jacket for chronically instrumented dogs." Horton 352 teaches an animal jacket containing a sleeve for chronically instrumented animals. Also, the jacket contains laces and gusseting to adjust itself to different-sized animals.

U.S. Pat. No. 6,513,457, by named inventor Huddleston ("Huddleston 457") is entitled, "Catch'em flea brush." Huddleston 457 teaches a grooming brush, which contains a compartment to insert a sticky sheet. The sticky sheet is made of material substantially similar to a lint roller brush. The objective of the invention is to brush an animal, dislodging fleas, and trapping them on the sticky sheet.

U.S. Pat. No. 5,579,720, by named inventors Udelle, et. al., ("Udelle 720") is entitled, "Animal hair confinement enclosure." The invention teaches a semi-cylindrical enclosure, with bristles on its inner surface. The invention has anchors, to mount it to the ground or floor. The animal walks through the invention, rubbing itself against the bristles, which trap the hair. This is a self-groomer for animals U.S. Pat. No. 5,458,088, by named inventor Owens, et. al., ("Owens 088") is entitled, "Grooming portal for pets." Owens 088 teaches that a pet door can have bristles, allowing the animal to self-groom.

U.S. Pat. No. 5,176,105, by named inventor Madden ("Madden 105") is entitled, "Fur grooming apparatus." Madden 105 teaches a self-grooming technique for small domestic animals. The invention is shaped like an upside down "U", and is formed by a u-shaped supporting structure. The invention has bristles covering every side of the supporting structure. The animal can self-groom by rubbing against the invention from a number of angles.

U.S. Pat. No. 6,138,611, by named inventor Thielemann ("Thielemann 611") is entitled, "Dog coat." Thielemann teaches a dog jacket, designed to keep the dog warm while outside. The jacket is made of elastic-type fabric so that it is movable with the dog's movement. The jacket is also water-repellant. The coat uses hook-and-loop fasteners (e.g., Velcro™)

U.S. Pat. No. 6,089,194, by named inventor LaBelle ("LaBelle 194") is entitled, "Reversible heat-reflective pet garment." This jacket is made of two materials, laminated together. The reflective material is Astrolon®, an aluminized clear polyethylene. The second material is just a colored polyethylene. The two materials are laminated using heat fusion. The resultant jacket is reversible. The heat reflective side is worn in the summer. The colored side is worn in the winter. Both sides are water-repellent.

U.S. Pat. No. 5,095,853, by named inventor Kruger ("Kruger 853") is entitled, "Vacuum cleaned pet comb." Kruger 853 discloses a grooming device comprised of a vacuum source, and a substantially cylindrical element with a vacuum opening and bristles arranged to dislodge and vacuum loose animal hair.

U.S. Pat. No. 5,067,444, by named inventor Parker ("Parker 444") is entitled, "Apparatus for grooming animals." Parker 444 teaches an invention that is attached to a blow dryer, in order to groom an animal. The substantially cylindrical invention has bristles and fits over the top of a conventionally sized blow-dryer.

US Patent Application 20100206242, by named inventor Jones ("Jones 242A") is entitled, "Massage therapy system for animals." Jones 242A teaches a massage glove that a human can use to provide a massage to a pet. The glove includes a vibrator, but does not include a brush, although the application says that the user can groom the animal while using the invention.

For the past 30 years, or more, there has been prior art disclosing animal jackets, animal massagers, and animal groomers. However, none of the art has put these elements together in a single, practical unit. Nor have any of these products created a device which allows for the animal hair to be captured in a easy, self-contained fashion, with little effort by the human. Clearly, the prior art is not meeting the need of the vast majority of animal owners.

SUMMARY OF INVENTION

The present invention differs from the tools primarily used in animal care, by removing the excess hair while it is still on the animal. The present invention is a jacket which fits on small, medium, and large domestic animals. The jacket has multiple massage units. In one embodiment, each massage unit has a serpentine track. A movable element, such as a small ball, is fitted to each track. The movable element is moved back and forth either by an electrical connection, a mechanical connection, or by pneumatic pressure. The vibrational and longitudinal motion of the movable element loosens hair on the animal. Additionally, the movable element may have nipples, ribs, or other surface features which tend to entrap or snare loose animal hair.

The present invention is also fitted with a multitude of small vacuum hoses on the side of the jacket facing the animal. The multitude of vacuum hoses are all connected to a common vacuum unit. As the massage units loosen hair, the vacuum unit collects it in a small hair-collection receptacle. The vacuum tubes are in close proximity to the massage unit movable-element track. The vacuum tubes have openings designed to easily capture animal hair, without clogging. The vacuum tubes are designed so that the pneumatic suction from the vacuum can easily collect all dislodged hair.

In order to work well with domestic animals, the present invention is fitted with a low-noise vacuum. The low-noise vacuum keeps the animal from being startled or scared by the massager unit. The low-noise vacuum may be specifically designed to emit attenuated sound waves at high frequencies the vacuum is a low-noise vacuum that emits little or no audible sounds at frequencies above 4 kHz.

In certain embodiments, the jacket can be fitted with cooling elements, so that it is practical for use during warm weather. The cooling unit can either be electrical in nature (such as a small condenser and evaporator), or it can be removable, re-freezable gel packet(s).

The jacket is also fitted with a single power source, that provides power for the vacuum and, in certain embodiments, the massage unit and/or the cooling unit. The power source is battery operated. The batteries may be disposable or re-chargeable. The batteries may be any commonly available current design providing 1.5-12.0 VDC.

DETAILED DESCRIPTION OF THE PREFERRED EMBODIMENTS

Figure 1:
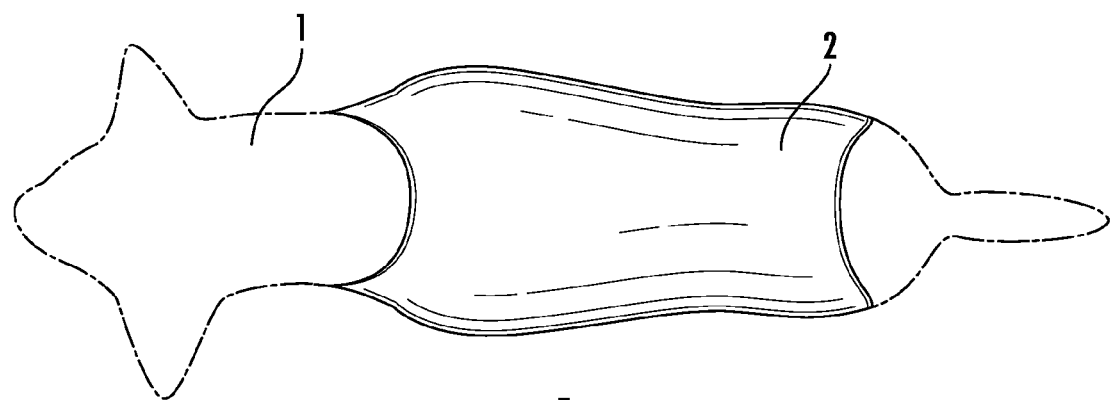
FIG. 1 is a top view of the present invention on a typical domestic animal (e.g., a medium-sized dog).
Figure 2:
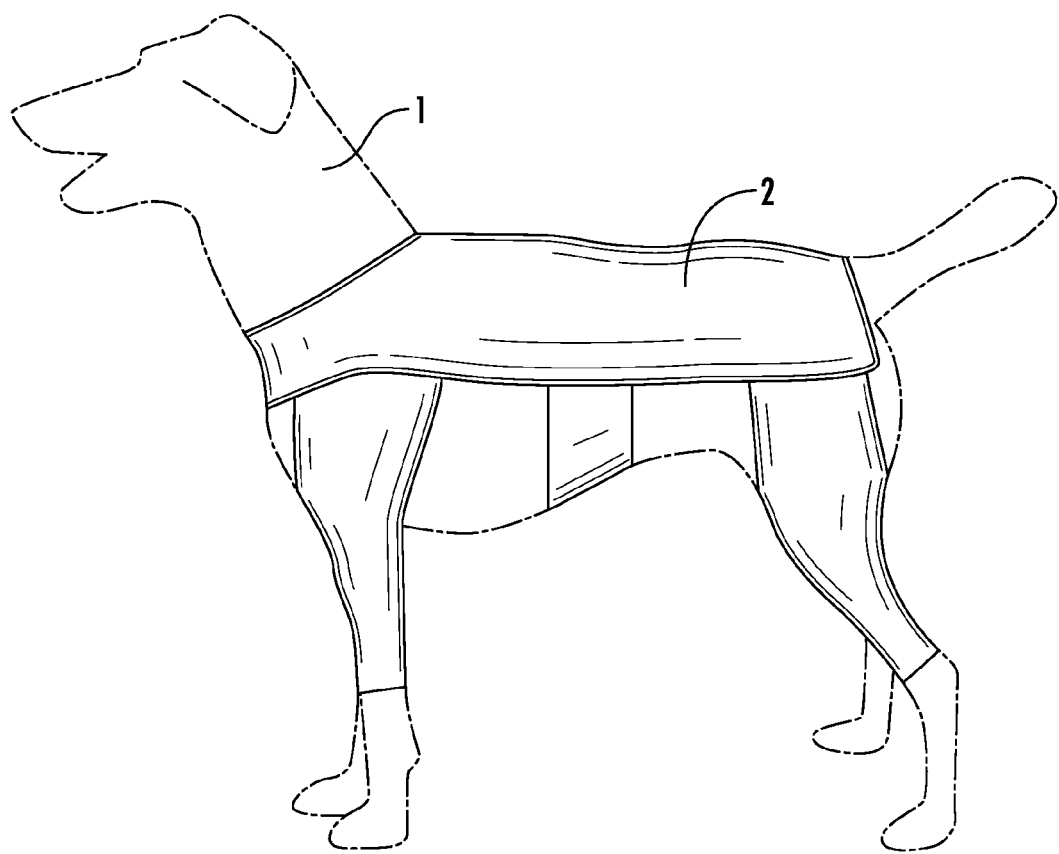
FIG. 2 is a side view of the present invention on a typical domestic animal.

The descriptions made herein are intended for illustration purposes and do not act as a limitation on the claimed invention. FIGS. 1 and 2 show a typical animal jacket 2 on a medium-sized domestic animal 1. The jacket 2 may have extensions that cover the animal's 1 legs, as well as straps around the stomach and neck in order to secure the jacket in place.

Figure 3:
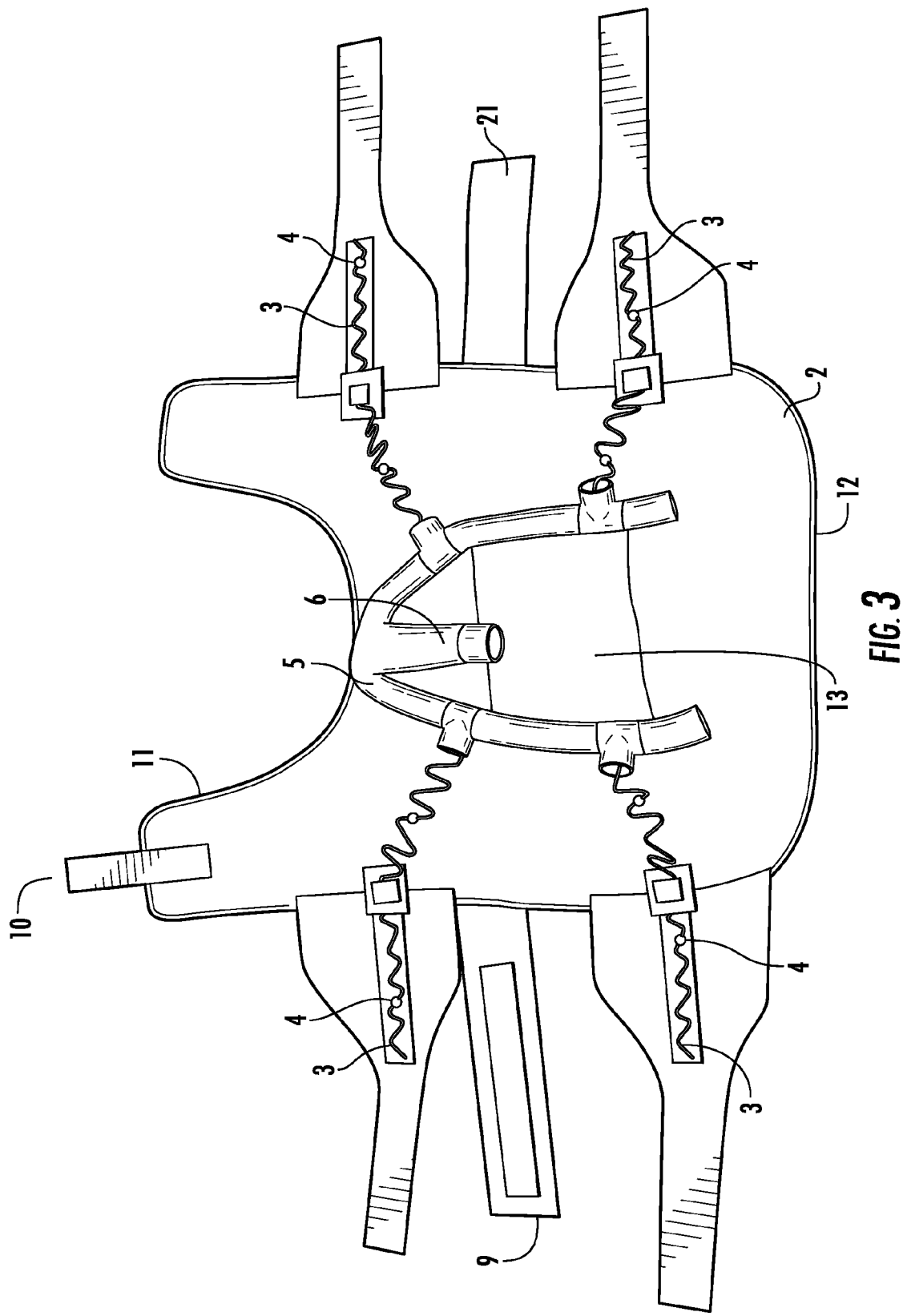
FIG. 3 is a perspective view of an embodiment of the present invention, showing the side that would be fitted next to the animal.

FIG. 3 is a simplified top view of the multi-function animal jacket 2, sans animal 1. It shows all of the elements discussed: an animal jacket 1, a multitude of serpentine massage tracks 3, a multitude of massage movable-elements 4, a multitude of vacuum hoses 5, 6 and a collection bag 13. The jacket 2 has a front edge 11 and a rear edge 12, and fastening straps 10, 9, 21.

Figure 4:
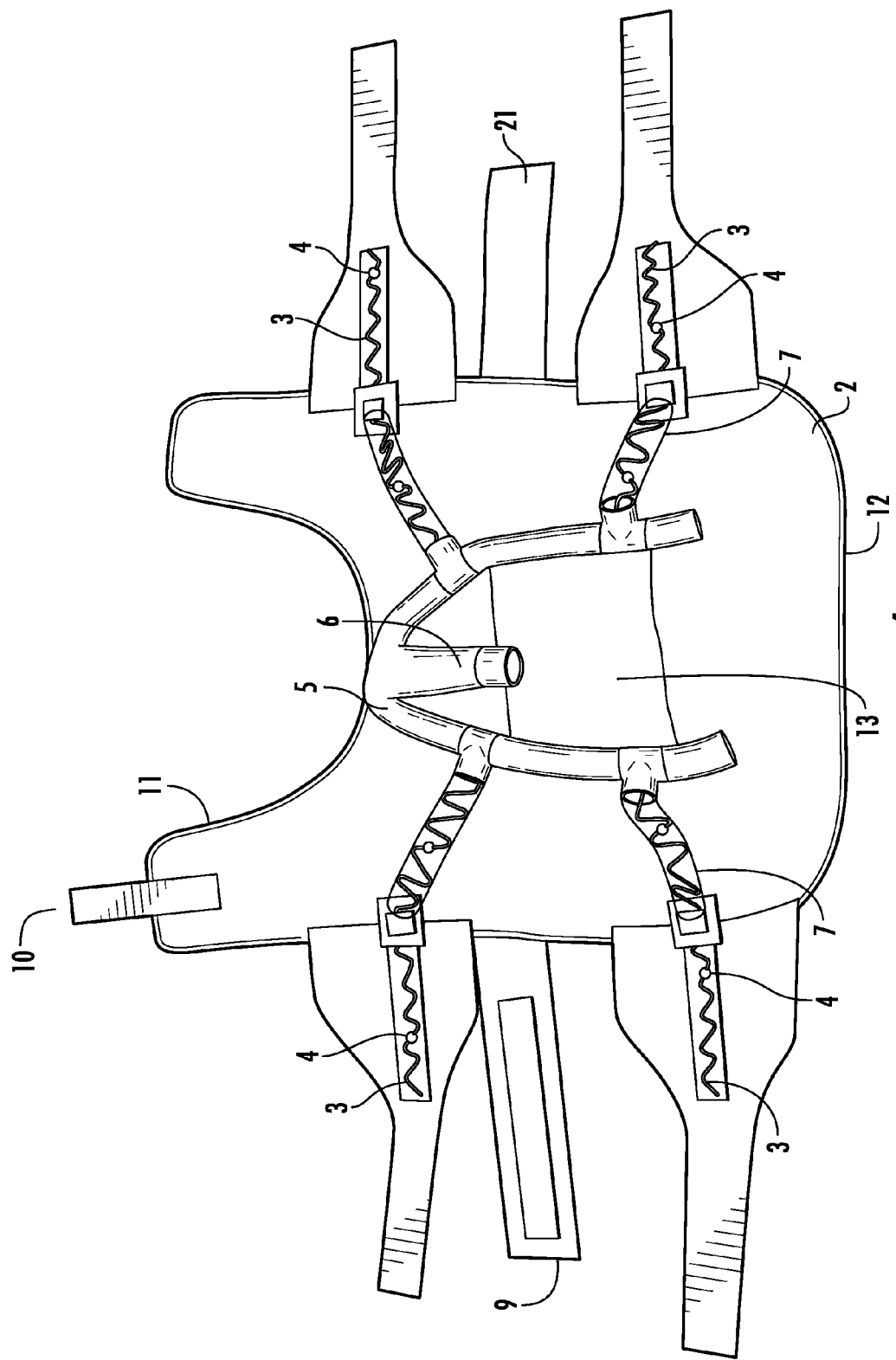
FIG. 4 is a perspective view of an alternative embodiment of the present invention, showing the side that would be fitted next to the animal.

FIG. 4 shows the same view as FIG. 3, but with extensions of the hair-collecting tubes 7. The extensions of the hair-collecting tubes 7 may be added to adjust performance of the invention. The invention may be created with or without these extensions 7. These extension tubes 7 may be perforated or non-perforated, in order to facilitate hair-removal.

Figure 5:
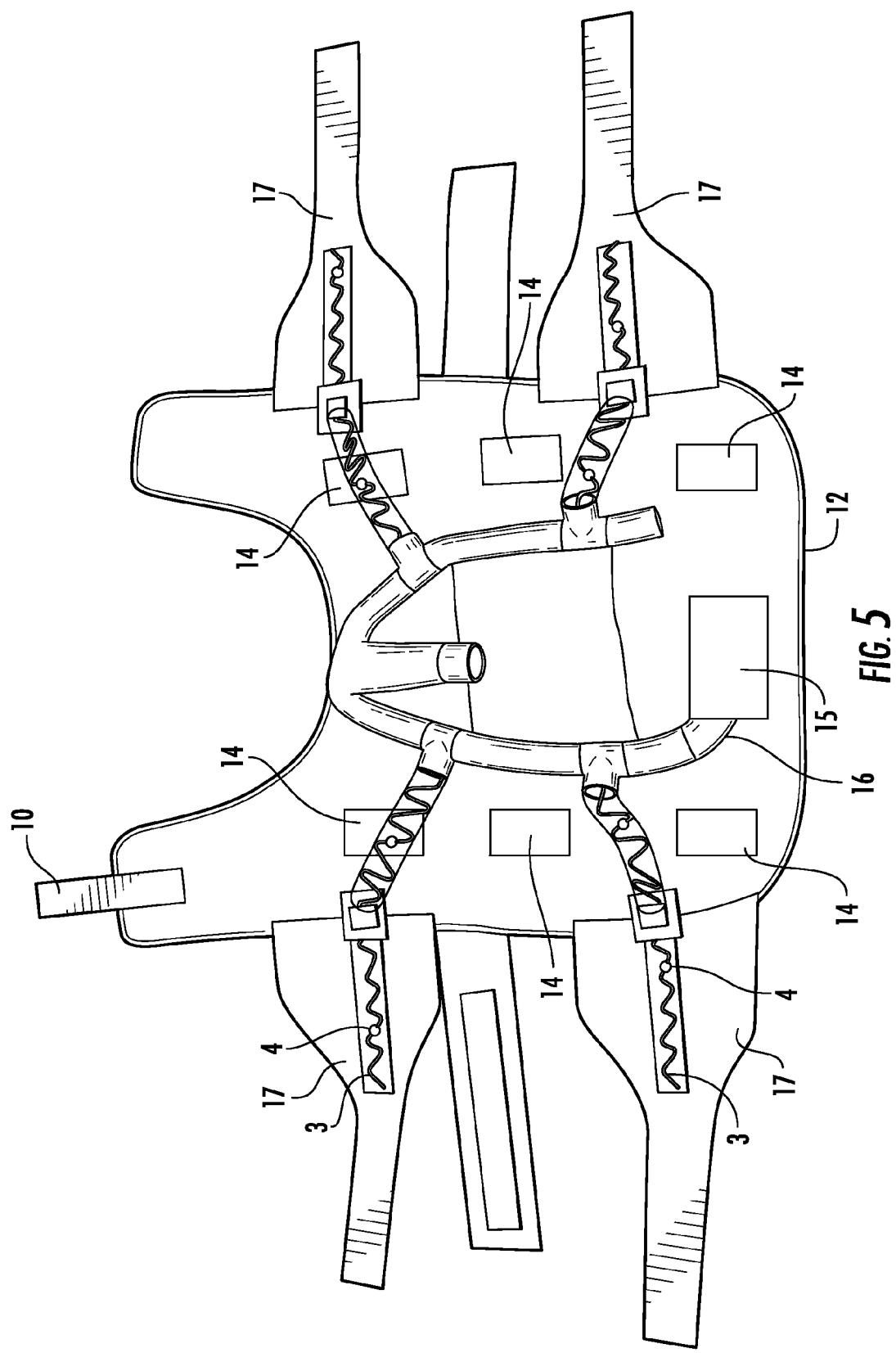
FIG. 5 is a perspective view of an alternative embodiment of the present invention, showing the side that would be fitted next to the animal.

FIG. 5 shows a full top view of the multi-function animal jacket 2. extended further towards the edge of the jacket 2. It, again, shows all of the elements discussed: the animal jacket 2, a multitude of serpentine massage tracks 3, a multitude of massage movable-elements 4, a multitude of vacuum hoses 5, 6, extension vacuum tubes 7, and a collection bag 13. This view shows the location of optional coolers 14, which can either be re-freezable and re-movable packets, or a small electronic chiller.

This view also shows a potential placement for a vacuum and power source 15. The multitude of hoses 5,6 and the extension vacuum tube 7 are connected to the vacuum through a hose adaptor 16.

This view also calls-out the leg-extensions 17 of the jacket 2, which may be appropriate, depending on the size of the animal.

Figure 6:
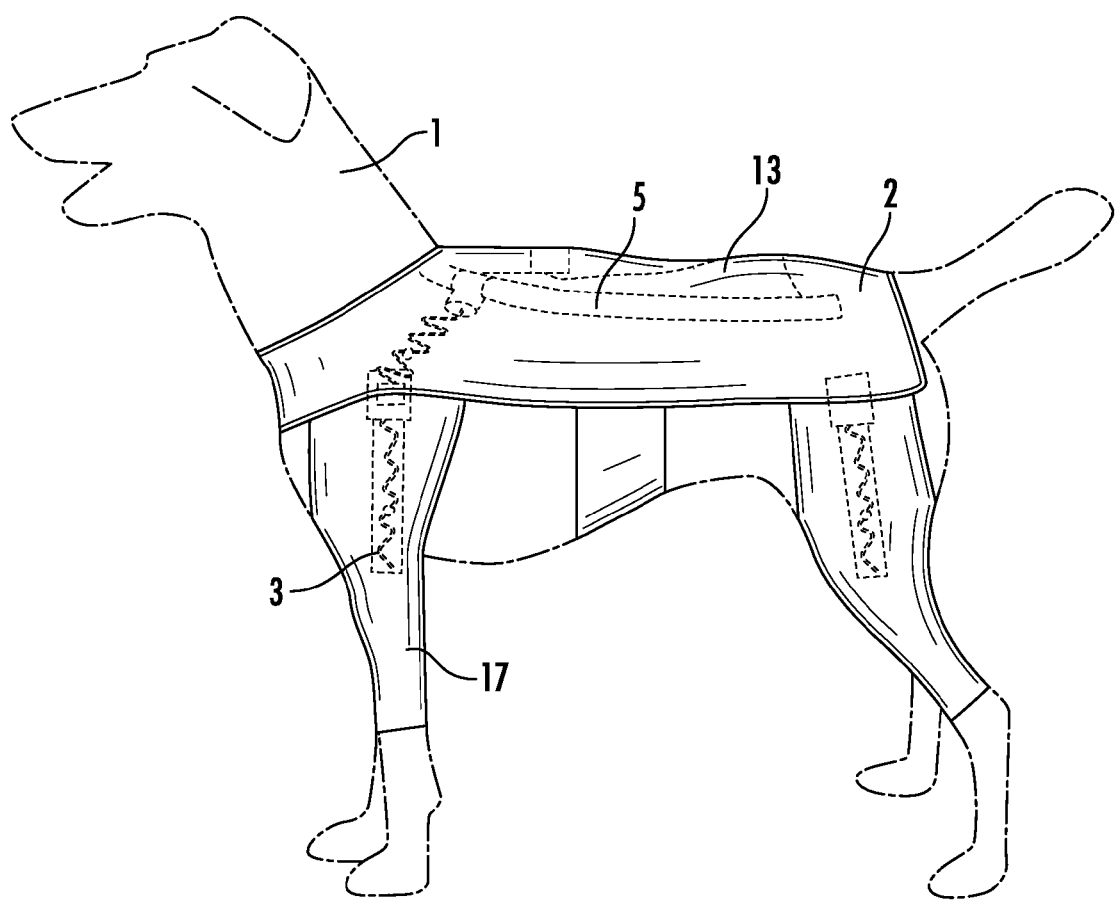
FIG. 6 is a transparent side view of the present invention on a typical domestic animal

FIG. 6 is a side view of a medium-sized animal 1, wearing the present invention. Certain elements are drawn with dotted lines, since they would be obstructed from view by the jacket 2, itself. Shown in dotted lines are the serpentine track 3, the leg extension 17, the vacuum hose 5, and the collection bag 13.

I claim:

1. An animal jacket comprising:
   a flexible fabric having an outer face, an inner face, a front edge, a back edge, a left-side edge and a right-side edge; the left-side and the right-side edges including straps to secure the animal jacket on a domesticated animal; and the front edge having a strap and an approximate semicircle contour to securely fasten around the neck and shoulders of the domesticated animal;
   an animal massager having a plurality of serpentine tracks secured on the inner face, and a plurality of movable elements placed in the plurality of serpentine tracks; the plurality of movable elements having nipples, ribs or other surface features to entrap or snare loose hair from the domesticated animal; the plurality of movable elements move back and forth by one of an electrical connection element, a mechanical connection element, or a pneumatic pressure element;
   a vacuum having flexible hoses and extension tubes to capture the animal's hair without clogging; the extension tubes configured to collect the animal's hair from the massager;
   a collection bag connected to the extension tubes for storing the animal's hair for disposal;
   a cooling system including re-freezable and re-movable packets or a small electronic chiller;
   a power source to provide power for the vacuum, the massager, and the cooling system.

2. The animal jacket of claim 1, wherein the vacuum is a low-noise vacuum that emits little or no audible sounds at frequencies above 4 kHz.

3. The animal jacket of claim 1, wherein the flexible fabric further comprises leg extensions extending from the left side edge and right side edge to wrap around legs of the domesticated animal.

* * * * *